United States Patent [19]

Auriol et al.

[11] Patent Number: 4,724,078

[45] Date of Patent: Feb. 9, 1988

[54] POROUS MATERIAL AND TUBULAR FILTER MADE OF SAID MATERIAL

[75] Inventors: Alain Auriol, Tarbes; Jacques Gillot, Odos, both of France

[73] Assignee: Ceraver, Paris, France

[21] Appl. No.: 744,458

[22] PCT Filed: Oct. 18, 1984

[86] PCT No.: PCT/FR84/00235

§ 371 Date: Jun. 10, 1985

§ 102(e) Date: Jun. 10, 1985

[87] PCT Pub. No.: WO85/01937

PCT Pub. Date: May 9, 1985

[30] Foreign Application Priority Data

Oct. 25, 1983 [FR] France .............................. 83 16975

[51] Int. Cl.$^4$ ............................................. B01D 39/20
[52] U.S. Cl. .................................. 210/490; 210/510.1; 501/80; 501/127; 501/153

[58] Field of Search .................... 210/510.1, 488–490, 210/503, 497.01, 497.2; 501/80, 127, 153

[56] References Cited

U.S. PATENT DOCUMENTS

| | | | |
|---|---|---|---|
| 1,081,573 | 12/1913 | Boeck | 210/510.1 |
| 2,464,517 | 3/1949 | Kurtz | 210/510.1 |
| 4,278,544 | 7/1981 | Takashima | 210/510.1 |

*Primary Examiner*—Ivars Cintins
*Attorney, Agent, or Firm*—Sughrue, Mion, Zinn, Macpeak, and Seas

[57] ABSTRACT

A porous material made from sintered inorganic particles. It has an open pososity of 30% to 40% by volume, a permeability to water at 20° ranging from 0.6 to 60 m$^3$/h.m$^2$.bar for a wall thickness of 2 cm as the average pore diameter varies from 2 to 20 microns and a crushing resistance, measured under conditions of isostatic compression, of $4 \times 10^8$ to $5 \times 10^8$ N/m$^2$.

9 Claims, No Drawings

POROUS MATERIAL AND TUBULAR FILTER MADE OF SAID MATERIAL

The present invention relates to a porous material made from sintered inorganic particles, and also to a tubular filter made of said material and suitable, in particular, for filtering liquids and gases.

Filter mediums of this type have already been proposed, but they are generally of relatively low efficiency since although they are highly permeable to fluids they are not capable of withstanding the relatively high head loss that would be required to obtain a high flow rate per unit area of filter, or for enabling recovery of the solid material collected on the surface of the filter by exerting pressure in the opposite direction to that taken by the fluid flow during filtering. They are also incapable of satisfactorily withstanding the high mechanical or thermo-mechanical stresses which often appear during assembly and during operation. If they are made thick enough to withstand high mechanical stresses, they are of low permeability and thus of low efficiency.

An object of the present invention is thus to provide a porous material which is both highly permeable and very strong with respect to mechanical and thermo-mechanical stresses, said material being usable for manufacturing mechanically strong filters of high efficiency.

The porous material in accordance with the invention is characterized in that it has an open porosity of 30% to 40% by volume and a crushing strength, measured under conditions of isostatic compression, of $4 \times 10^8$ to $5 \times 10^8$ N/m$^2$.

It preferably includes at least one of the following characteristics:

Its bending strength lies in the range 2.5 to $3.5 \times 10^7$ N/m$^2$;

The average diameter of its pores lies in the range 2 to 20 microns;

Its permeability to water at 20° C. ranges from 0.6 to 60 m$^3$/h.m$^2$.bar for a wall thickness of 1 cm, and as the average pore diameter goes from 2 to 20 microns.

It is composed of a mixture of metal oxides including more than 20% by weight alumina;

It is constituted by alumina which is at least 99.9% by weight pure.

A tubular filter in accordance with the invention is characterized in that it comprises a thick porous layer constituting a support layer in a material such as defined above, together with at least one thin porous filter layer made from inorganic particles which are sintered to one another and to the internal or external surface of the support layer, the pores of the filter layer having a diameter of less than 10 microns and being smaller than the those of the support layer, the radial thickness of each filter layer not exceeding a few tens of microns.

The filter preferably includes at least one of the following characteristics:

The average pore diameter of the layer having the finest pores is about 0.2 microns;

The support layer includes at least two sub-layers of different pore diameters which are connected to one another by sintering, the sub-layer having the finest pores being disposed between the filter(s) and the other sub-layer;

The ratio of the outside diameter of the tube to its radial thickness lies in the range 4 to 20;

Its resistance to internal pressure ranges from 30 bars to 240 bars as the ratio of the outside diameter to the radial thickness ranges from 20 to 4.

The preparation and the main physical and mechanical properties of tubular filters in accordance with the invention is described below by way of example.

EXAMPLE 1

A paste is prepared comprising a mixture of:

40% electro-melted alumina having an average grain size of 29 microns;

30% electro-melted alumina having an average grain diameter of 17 microns;

30% alumina having a average grain diameter of 2.5 microns;

9% industrial vaseline;

16% of an aqueous gel constituted by 1.5% methylhydroxylpropyl cellulose and 14.5% water.

These quantities are expressed in weight percent relative to the dry alumina content.

The paste prepared in this manner is extruded at a pressure of 120 bars in the form of tubes having a diameter of 20 mm and a thickness of 2 mm.

The tubes are then dried to eliminate the organic binders and then baked in a reducing atmosphere at 180° C. This provides porous tubes having the following characteristics:

outside diameter: 19 mm thickness: 2 mm porosity: about 35 volume % average pore diameter: 12 microns permeability to air at 20° C. and 1 atmosphere: 10,000 Nm$^3$/h.m$^2$.bar permeability to water measured at 20° C.: 120 m$^3$/H.m$^2$.bar resistance to isostatic compression: $450 \times 10^6$ N/m$^2$ bending strength: $30 \times 10^6$ N/m$^2$ resistance to internal pressure: 70 bars = $7 \times 10^6$ N/m$^2$.

The crushing strength of the tubes is measured as follows: the inside and outside surfaces of the tube are enveloped in a flexible waterproof membrane. The assembly is subjected to isostatic compression in a liquid. The resistance to isostatic compression is the maximum isostatic pressure which the tube can withstand without being damaged at any point.

The bending strength is measured by the known method of bending by means of 4 pressure points. Known beam equations can then be used to calculate the stress at which the tube breaks.

The resistance to internal pressure (or to bursting) is measured by inserting a flexible tubular waterproof membrane into the tube. A liquid is inserted into the membrane under pressure and the pressure is increased until the tube bursts.

EXAMPLE 2

A tubular support layer is prepared as indicated in example 1. In order to deposit a filter layer having an average pore diameter of 1.2 microns on the inside surface thereof, the following steps are performed:

A slip is prepared having the following composition:

Alumina having an average grain diameter of 2.5 microns (measured after the slip has been crushed): 8% by mass;

Water having polyethylene glycol (Carbowax 4000C from Union Carbide) added thereto to obtain a viscosity of 5 poises: 91.8%; and "DARVAN C" wetting agent from the Polyplastic Company: 0.2%.

This slip is crushed for 24 hours in a ball mill having a capacity of 25 liters which is filled as follows:
  25 kg of 10 mm diameter alumina balls; and
  7 liters slip.

The essential purpose of this operation is to break up agglomerations of grains and to thoroughly disperse the particles.

The previously prepared tube is filled with this slip and then emptied under gravity. There remains a film of slip on the inside surface of the tube, and this film is dried and then baked under an oxidizing atmosphere at 1550° C. to form a layer having a thickness of 20 to 30 microns and having an average pore diameter of 1.2 microns.

The filter tube thus obtained possesses the following characteristics:
  outside diameter: 19 mm
  thickness: 2 mm
  porosity of the support layer: 35%
  average support layer pore diameter: 12 microns
  thickness of the filter layer: about 20 microns
  average filter layer pore diameter: 1.2 microns
  porosity of the filter layer: about 30%
  permeability to air measured at 20° C. and 1 atmosphere: 4,500 Nm$^3$/h.m$^2$.bar
  permeability to water measured at 20° C.: 40 m$^3$/h.m$^2$.bar
  resistance to isostatic compression: $450 \times 10^6$ N/m$^2$
  bending strength: $30 \times 10^6$ N/m$^2$
  resistance to internal pressure: 70 bars = $7 \times 10^6$ N/m$^2$.

EXAMPLE 3

A tubular support layer is prepared as indicated in example number 1. On the inside surface of this tube a double filter layer is deposited comprising a first alumina layer having an average pore diameter of 1.2 microns and then a second titanium dioxide layer having an average pore diameter of 0.2 microns, by performing the following steps:

A first filter layer is deposited as indicated in example 2;

A second filter layer is then deposited using the same method but using a slip having the following composition:
  Titanium dioxide (in rutile form) having an average particle diameter of 0.2 microns: 5% by mass;
  Water having polyethylene glycol (Carbowax 4000 C from Union Carbide) added thereto to obtain a viscosity of 5 poises: 94.8%;
  "DARVAN C" setting agent from the Polyplastic Company: 0.2%;

And the baking temperature is limited to 1000° C.

The filter tube thus obtained has the following characteristics:
  outside diameter: 19 mm
  thickness: 2 mm
  porosity of the support layer: 35%
  average support layer pore diameter: 12 microns
  thicknesses of the filter layers: 1st layer about 20 microns, 2nd layer about 10 microns
  average pore diameter of finest filter layer: 0.2 microns
  porosity of both filter layers: about 30%
  permeability to air measured at 20° C. and 1 atmosphere: 1,000 Nm$^3$/h.m$^2$.bar
  permeability to water measured at 20° C.: 3 m$^3$/h.m$^2$.bar
  resistance to isostatic compression: $450 \times 10^6$ N/m$^2$
  bending strength: $30 \times 10^6$ N/m$^2$
  resistance to internal pressure: 70 bars = $7 \times 10^6$ N/m$^2$.

EXAMPLE 4

A filter tube is made including a support layer identical to that in example 3 and two filter layers identical to those of example 3 except that they are deposited on the outside surface of the support tube. To do this, the steps of example 3 are followed except that the filter layers are deposited by immersing the tube in the slip and then allowing it to drip dry. A filter tube is obtained having the same characteristics as the example 3 filter tube, except that:

the filter layers are in a different position, being situated on the outside surface of the filter tube; and, the permeabilities to air and to water are increased by a factor of about 1.25 (being the ratio between the diameters and consequently between the areas of the filter layers).

EXAMPLE 5

A filter tube is made analagous to the example 2 filter tube except that the support layer is formed from two such layers having different average pore diameters.

To do this, two ceramic pastes are prepared:
  The first paste is identical to the example 1 paste; and
  The second paste is different therefrom only in the grain size of the various alumina fractions from which it is made up:
  25% of electro-melted alumina having an average grain size of 23 microns;
  45% of electro-melted alumina having an average grain size of 13 microns; and
  25% calcinated alumina having an average grain size of 2.5 microns.

The pastes prepared in this manner are coaxially coextruded in such a manner as to form a tube of 20 mm diameter and of 2 mm thickness, comprising an outer layer made from the first paste and an inner layer made from the second paste, the layers having approximately the same thickness.

After drying and baking as in example 1, a filter layer is deposited as in example 2 to obtain a filter tube which has the following characteristics:
  outside diameter: 19 mm
  thickness: 2 mm
  average support layer pore diameter: 1st sublayer: 12 microns, 2nd sublayer: 9 microns
  porosity of the support layer: 1st sublayer: 35%, 2nd sublayer: 32%
  thickness of the filter layer: about 20 microns
  average filter layer pore diameter: 1.2 microns
  porosity of the filter layer: about 30%
  permeability to air measured at 20° C. and 1 atmosphere: 4,000 Nm$^3$/h.m$^2$.bar
  permeability to water measured at 20° C.: 37 m$^3$/h.m$^2$.bar
  resistance to isostatic compression: $450 \times 10^6$ N/m$^2$
  resistance to internal pressure: 80 bars = $8 \times 10^6$ N/m$^2$.

The resistance to internal pressure is increased relative to examples 1 to 4 since it is the inner support layer which withstands the highest pressure and the material of this inner layer is stronger in this case than the material of the outer layer.

What is claimed is:

1. A porous material formed of sintered alumina particles, of a purity at least equal to 99.9% by weight, said material having an open porosity of 30% to 40% by volume, pores of average diameter of between 2 to 20 microns and wherein said porous material is resistant to crushing, having a crushing strength measured under conditions of isostatic compression of $4 \times 10^8$ to $5 \times 10^8$ N/m$^2$.

2. A porous material according to claim 1, characterized in that its bending strength lies in the range 2.5 to $3.5 \times 10^7$ N/m$^2$.

3. A porous material according to claim 2, characterized in that it has a permeability to water at 20° C. ranging from 0.6 to 60 m$^3$/h.m$^2$.bar for a wall thickness of 1 centimeter as the average pore diameter ranges from 2 to 20 microns.

4. A porous material according to any one of claims 1 or 3, characterized in that it is made up from a mixture of metallic oxides including more than 20% by weight alumina.

5. A tubular filter comprising a thick porous support layer formed of sintered alumina particles of a purity at least equal to 99.9% by weight, said alumina having an open porosity of 30% to 40% by volume, the average diameter of the pores being between 2 and 20 microns and having having a resistance to crushing, measured under conditions of isostatic compression of $4 \times 10^8$ to $5 \times 10^8$ N/m$^2$, and at least one thin porous filter layer formed from inorganic particles which are sintered to one another and to the inside or outside surface of the support layer, the pores of the filter layer having a diameter of less than 10 microns and being finer than the pores of the support layer, and wherein the radial thickness of each filter layer does not exceed several tens of microns.

6. A tubular filter according to claim 5, characterized in that the average pore diameter of the layer having the finest pores is about 0.2 microns.

7. A tubular filter according to claim 5 or 6, characterized in that the support layer includes at least two sublayers having pores of different diameters and connected by sintering, the sublayer having the finest pores disposed between the filter layer(s) and the other sublayers.

8. A tubular filter according to claim 5, characterized in that the ratio between its outside diameter and its radial thickness lies in the range 4 to 20.

9. A tubular filter according to claim 5, characterized in that its resistance to internal pressure ranges from 30 bars to 240 bars as the ratio of outside diameter to radial thickness ranges from 20 to 4.

* * * * *